United States Patent

[11] 3,617,880

[72] Inventors George D. Cormack;
Ronald P. Manning, Ottawa, Ontario, Canada
[21] Appl. No. 37,724
[22] Filed May 15, 1970
[45] Patented Nov. 2, 1971
[73] Assignee Northern Electric Company, Limited
Montreal, Quebec, Canada

[54] TIME DOMAIN REFLECTOMETER
4 Claims, 5 Drawing Figs.
[52] U.S. Cl. .................................................. 324/57,
324/58 B, 324/58 R
[51] Int. Cl. ....................................................... G01r 27/06
[50] Field of Search............................................ 324/57, 58
B, 58 C, 58.5 B, 58.5 C

[56] References Cited
UNITED STATES PATENTS
2,649,570 7/1953 Radcliffe ...................... 324/58 B 3,535,628 10/1970 Altes ........................... 324/58 B Primary Examiner—Herman Karl Saalbach
Assistant Examiner—Saxfield Chatmon, Jr.
Attorney—Curphey & Erickson ABSTRACT: A typical sampling time domain reflectometer (T.D.R.) apparatus is modified by the addition of an integrator which can be selectively switched into and out of the vertical signal path. The integrator is utilized to integrate signals reflected from any reactive discontinuity in a transmission line under test. The amplitude of the integrated signal is utilized to enable the accurate determination of the reflection coefficient. The derived results are substantially unaffected by variations in the rise time of the step function signal. In addition, the apparatus' independence from the step function signal rise time enables the use of a longer rise time and thus the system's bandwidth requirement is lessened to the point where a real time T.D.R. apparatus may be utilized.

INVENTORS
GEORGE D. CORMACK
RONALD P. MANNING
BY *Curphey + Erickson*
PATENT AGENTS

TIME DOMAIN REFLECTOMETER

FIELD OF THE INVENTION

This invention relates to the field of electrical measurement and more particularly to time domain reflectometry methods and apparatus for the measurement of reactive discontinuities in transmission lines.

DESCRIPTION OF THE PRIOR ART

In order that a transmission system carry an electrical signal efficiently, it is necessary that the transmission line portion of the system be of uniform electrical characteristics throughout its entire length. This however, is not practical as imperfections in manufacture, splices in the line and damage incurred after installation cause reactive irregularities to be present at randomly spaced intervals along the line. These irregularities cause reflections of the signal resulting in attenuation and phase distortion of the received signal. A measure of the quality, of a transmission line or any part of a transmission line, can be made by observing the signal reflected back to the transmitting or source end of the line, in relationship to the original transmitted signal.

Apparatus have been used to measure the standing wave ratio at a particular frequency. The resulting curves of magnitude and phase of the standing wave ratio can, in simple cases, be unscrambled and interpreted to yield the location and nature of a reactive discontinuity, but the interpretation, at best, is difficult. With each alteration or attempted improvement to the line, a completely new set of data must be taken and reinterpreted. This process is very time consuming. The use of a swept frequency reflectometer apparatus will speed up the measurement process considerably and can provide measurement over a desired frequency band, but does nothing to simplify the task of interpretation.

A more direct method of determining the quality of a transmission line is to transmit a step function signal along it and observe any resulting reflections. Time domain reflectometer apparatus have been used in the past to locate faults in wide band transmission lines such as coaxial cables. A typical time domain reflectometer consists of a fast rise time step function generator used as a source of incident step function signals to drive the system under test and a rise time oscilloscope, typically a sampling type oscilloscope, to display the incident signals and any reflections of the incident signals. Typical apparatus combine these two basic elements, along with some control refinements, within one basic unit. Examples of some time domain reflectometer apparatus and their applications can be found in the following publications: "Cable Testing with Time Domain Reflectometry," Hewlett Packard note No. 67; "Time Domain Reflectometry," Hewlett Packard Journal Vol. 15 No. 6, Feb. 1964; "A Discussion of Time Domain Reflectometry Theory and Coaxial Cable Testing," Tektronix Service Scope No. 45, Aug. 1967; and in Hewlett Packard Journal Vol. 21 No. 1, Sept. 1969.

Present time domain reflectometer apparatus and their methods of operation do not enable the exact evaluation of single and multiple reactive components of transmission line reactive discontinuities. Consequently the determination of values of reflection coefficient and return loss, as a measure of transmission line quality, are difficult to make. A reflection coefficient may be defined, at a particular frequency, as the ratio of the amount of signal reflected from a reactive discontinuity back to the input of the transmission line with respect to the original signal input. The problem lies in the determination of the amount of signal reflected. Methods suggested in the aforementioned Hewlett Packard and Tektronix publications, entail an approximate interpretation of a reflected signal to determine the capacitive or inductive elements associated with a particular reactive discontinuity. In order to determine the reflection coefficient at any particular frequency two further calculations must be made. First, the effective impedance of the reactive discontinuity must be determined. From this impedance and the characteristic impedance of the transmission line the reflection coefficient can be determined.

The above methods of determining the capacitive or inductive elements of a reactive discontinuity have practical limitations which involve the incident step function signal having a finite rise time. No matter how fast the rise time of an incident signal, any transmission line of limited bandwidth characteristics will lengthen the rise time of a signal reflected in approximate proportion to the length of the line between the input to the line and the reactive discontinuity in question. By prior known methods, this finite rise time signal will yield a reflection from which only estimatable values of inductance or capacitance can be determined. In addition, these methods are most erroneous if more than one discontinuity is situated within the rise time duration. Thus, under these conditions, determination of the components comprising any reactive discontinuities and of the reflection coefficient tends to become significantly erroneous and therefore the quality of the transmission line is not accurately determinable.

SUMMARY OF THE INVENTION

It has been discovered that by integrating the signal reflected from a reactive discontinuity that the reflection coefficient and therefore the transmission line quality may be accurately determined.

The present invention is a method and apparatus for measuring the reflection coefficient of at least one reactive discontinuity in a transmission line. The apparatus comprises a means for applying an incident step function signal to one end of the transmission line, a means for integrating at least one signal reflected from the transmission line and a means for displaying the incident step function signal and the integrated signal. The displayed signals are used to determine the reflection coefficient of each discontinuity from the formula $$\Gamma = \frac{2\pi f \left(\frac{A_i}{A_s}\right)}{1 - \left[\frac{Z_0 - Z_g}{Z_0 + Z_g}\right]^2}$$

where:

$\Gamma$ is the reflection coefficient of the discontinuity, $f$ is the frequency at which the reflection coefficient measurement is desired, $A_s$ is the amplitude of the incident step function signal, $A_i$ is the amplitude of the integrated signal, $Z_0$ is the characteristic impedance of the transmission line, $Z_g$ is the impedance of the incident step function signal source.

The method comprises the steps of applying an incident step function signal to one end of the transmission line, integrating at least one signal reflected from the transmission line and of displaying the incident step function signal and the integrated signal. The displayed signals are used to determine the reflection coefficient of at least one reactive discontinuity from the above formula.

BRIEF DESCRIPTION OF THE DRAWINGS

An example embodiment of the invention will now be described with reference to the accompanying drawings in which.

DESCRIPTION OF THE PREFERRED EMBODIMENT

Figure 1:
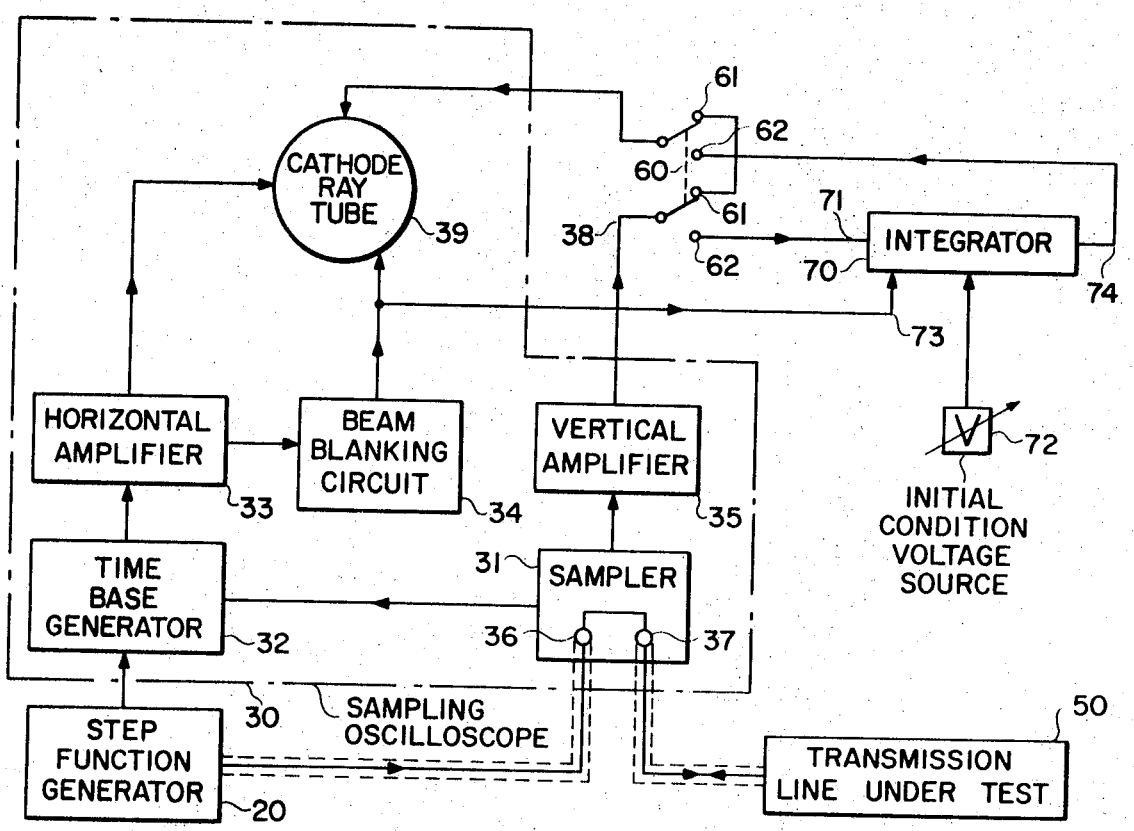
FIG. 1 is a block circuit diagram of a time domain reflectometer (T.D.R.) apparatus in accordance with the present invention.

Referring to FIG. 1 of the drawings, the T.D.R. apparatus basically comprises a step function generator 20, a sampling-type oscilloscope 30 and an integrator 70. The signal output of the generator 20 is coaxially connected to one input 36 of a sampler 31 and the trigger output of the generator 20 is connected to one input of a time-base generator 32. A gating output of the sampler 31 is connected to the other input of the time-base generator 32. The output of the time-base generator 32 is connected to the input of a horizontal amplifier 33. The horizontal sweep output of the horizontal amplifier 33 is connected to the horizontal deflection plates of a cathode ray tube (C.R.T.) 39. A control output of the horizontal amplifier 33 is connected to a beam blanking circuit 34, the output of which is connected to the beam intensity control terminal of the C.R.T. 39. The vertical signal output of the sampler 31 is connected to the input of a vertical amplifier 35. A double pole double throw switch 60 having a pair of make contacts 61 and a pair of break contacts 62, is connected between the output of the vertical amplifier 35 and the vertical deflection plates of the C.R.T. 39, so that when the switch 60 is in one position the output of the vertical amplifier 35 is connected via the make contacts 61 to the vertical deflection plates of the C.R.T. 39. The integrator 70 having input, reset and output terminals 71, 73 and 74 respectively and an initial condition voltage source 72, is connected to the break contacts 62. When the switch 60 is in the other position, the output of the vertical amplifier 35 is connected via one break contact 62 to the input terminal 71 and the output terminal 74 is connected via the other break contact 62 to the vertical deflection plates of the C.R.T. 39. The reset terminal 73 is connected to the output of the beam blanking circuit 34. A transmission line under test 50 is coaxially connected to the input terminal 37 of the T.D.R.

Figure 2:
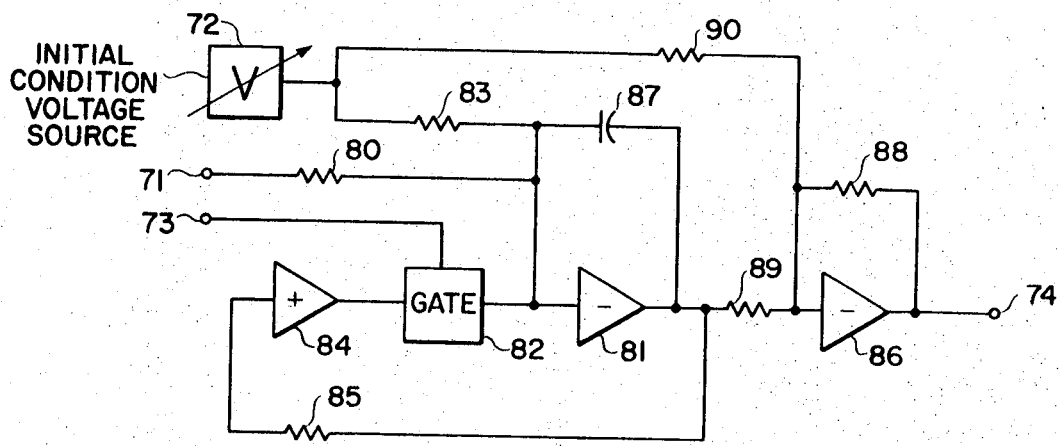
FIG. 2 is a block and schematic diagram of an integrator used in the T.D.R. apparatus of FIG. 1.

Referring to FIG. 2 of the drawings, the integrator 70 comprises an input resistor 80 connected between the terminal 71 and the input of a first inverting operational amplifier 81 in common with the output of a gate 82. A resistor 83 is connected between the output of the initial condition voltage source 72 and the input of the first inverting operational amplifier 81. A feedback resistor 85 is connected between the output of the first inverting amplifier 81 and the input of the noninverting amplifier 84. The reset terminal 73 is connected to the control input of the gate 82. The output of the noninverting amplifier 84 is connected to the input of the gate 82. The output of the first inverting amplifier 81 is connected via an input resistor 89 to the input of a second inverting amplifier 86. A resistor 90 is connected between the source 72 and the input of the second amplifier 86. A capacitor 87 is connected between the input and the output of the first inverting amplifier 81. A feedback resistor 88 is connected between the input of the second inverting amplifier 86 and the output of the second inverting amplifier 86 in common with the output terminal 74.

In the operation of the T.D.R. apparatus the step function generator 20 generates a step function signal and transmits this signal via the terminals 36 and 37 to the transmission system under test 50. The step function generator 20 also generates a trigger signal which starts the time base circuit 32. The sampler 31 generates gating control signals to incrementally advance the output signal of the time base circuit 32. The horizontal amplifier 33 amplifies the output of the time base circuit 32 and provides this signal as a horizontal sweep signal, to the horizontal deflection plates of the C.R.T. 39. The amplifier 33 also provides a control signal to the beam blanking circuit 34, enabling this circuit to provide a beam blanking signal to the C.R.T. 39, so that the cathode ray beam of the C.R.T. 39 will be blanked out during the retrace period of the horizontal sweep signal. The sampler 31 simultaneously samples the step function signal and any reflections of the step function signal originating from the transmission system 50.

While the switch 60 is in one position, the output of the sampler 31 is amplified in the vertical amplifier 35 and is supplied to the vertical deflection plates of the C.R.T. 39. The foregoing description of the operation of a T.D.R. is well known and typical of well known T.D.R. apparatus.

In an integrating mode of operation, not available in prior T.D.R. apparatus, the signal from the vertical amplifier 35 is conducted via one break contact 62 to the input terminal 71 of the integrator 70. The integrator is so arranged that it integrates, under the control of an operator, at least one signal reflected from the transmission system 50. The beam blanking circuit 34 also supplies the beam blanking signal to the reset terminal 73 so that the integrator 70 will be reset to the voltage level of the initial condition voltage source 72 during the retrace portion of the horizontal sweep signal. The output of the integrator 70 is the integral of the samples of the signals reflected. The output is conducted from the output terminal 74 via the other break contact 62 to the vertical deflection plates of the C.R.T. 39.

In the operation of the integrator 70 illustrated in FIG. 2 of the drawings, the voltage level of the voltage source 72 must be adjusted so that the integrator 70 will only integrate the samples of the signals reflected and not the samples of the generated step function signals. After the integrator is connected via the pair of break contacts 62 in FIG. 1, the operator must observe the signal displayed on the C.R.T. 39 in FIG. 1 and adjust the initial condition voltage source 72 until there is a vertically flat line display seen at the beginning of a horizontal sweep. When the integrator 70 is in the reset mode, the initial condition voltage source serves to apply an initial condition voltage as required to the input of the second amplifier 86 via the resistor 90. The gate 82, which is under the control of the terminal 73, connects the output of the amplifier 84 to the input of the inverting amplifier 81, establishing a closed feedback loop via the resistor 85, and thus holds the voltage at the input and output of the inverting amplifier 81 at virtually zero. The voltage source 72 provides an initial condition voltage, equal and opposite to the initial step function voltage at the beginning of the horizontal sweep. When the integrator is in the integrating mode, signals appearing at the terminal 71 which are different in voltage from the initial condition voltage are integrated in a well known manner by the action of the resistor 80, the resistor 83, the capacitor 87 and the inverting amplifier 81. The signal from the output of the inverting amplifier 81, is inverted and amplified by the second inverting amplifier 86, the amount of amplification being determined by the feedback resistor 88 and the input resistor 89. The output of the amplifier 86 is connected via the output terminal 74 and the other break contact 62 of FIG. 1 to the vertical deflection plates of the C.R.T. 39 of FIG. 1, where it is displayed.

Figure 3A:
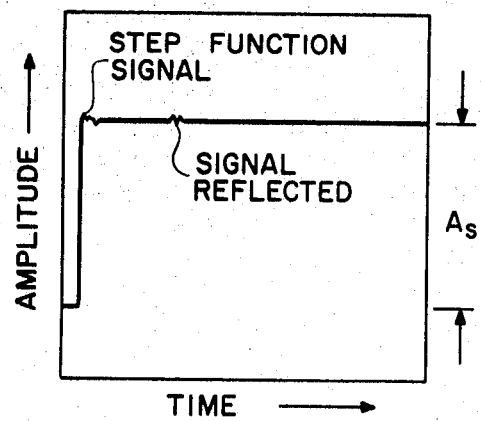
FIGS. 3a, 3b and 3c are typical graphical examples of a step function signal having a reflected signal therein, a reflected signal and the integral of the reflected signal respectively, as they are displayed by the T.D.R. apparatus in FIG. 1. In each FIG., 3a, 3b and 3c, the vertical axis is amplitude and the horizontal axis is time.
Figure 3B:
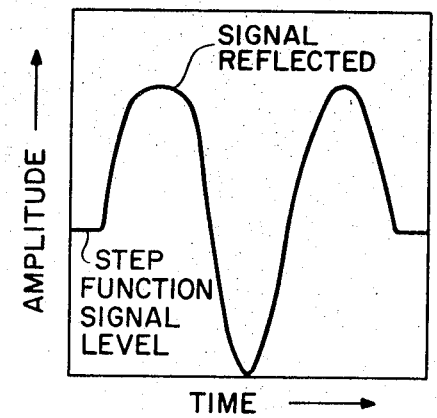

A step function signal with a signal reflected from a discontinuity in the transmission line 50, added to it, is illustrated in FIG. 3a and is a typical initial waveform which an operator of the T.D.R. apparatus may view on the C.R.T 39. The operator then adjusts the apparatus in a well known manner so as to view only the signal reflected as illustrated in FIG. 3b.

Figure 3C:
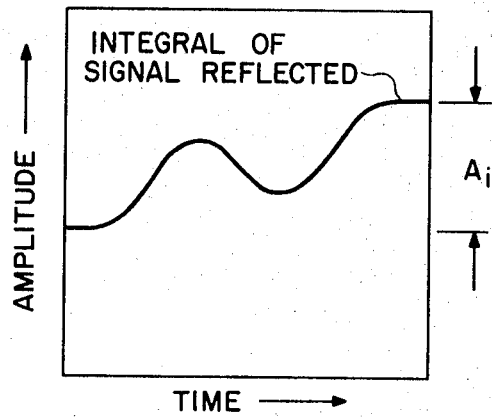

In order to measure the integral of the samples of the signal reflected, the operator switches the integrator 70 into series with the vertical signal path and then adjusts the source 72 until the initial portion of the horizontal sweep displayed is virtually a flat line, as shown in FIG. 3c. The operator then measures the amplitude of the integral of the signal reflected so that he may determine the reflection coefficient of the reactive discontinuity from the following formula $$\Gamma = \frac{2\pi f \left(\frac{A_i}{A_s}\right)\left(\frac{t_r}{t_s}\right)}{1 - \left[\frac{Z_0 - Z_\rho}{Z_0 + Z_\rho}\right]^2}$$

where:

$\Gamma$ is the reflection coefficient of at least one discontinuity, $f$ is the frequency at which the reflection coefficient measurement is desired, $A_s$ is the amplitude of the incident step function signal, $A_i$ is the amplitude of the integrated signal,
$Z_o$ is the characteristic impedance of the transmission line,
$Z_g$ is the output impedance of the function generator,
$t_r$ is real time,
$t_s$ is horizontal sweep time.

The term $t_r/t_s$ is necessary here to convert the above equation from the sampling time of the apparatus into the real time of the signal reflected.

The return loss in units of decibels may be derived from the following formula $$R.L. = -20 \log_{10} |\Gamma|$$

If the discontinuity is inductive, the integrated signal will add positively to the step function signal and the inductance may be determined from the following formula $$L = \frac{2Z_0 \left(\frac{A_i}{A_s}\right)\left(\frac{t_r}{t_s}\right)}{1 - \left[\frac{Z_0 - Z_g}{Z_0 + Z_g}\right]^2}$$

Conversely, if the discontinuity is capacitive the integrated signal will subtract from the step function signal and the capacitance may be determined from the following formula $$C = \frac{-2\left(\frac{A_i}{A_s}\right)\left(\frac{t_r}{t_s}\right)}{Z_0 \left[1 - \left(\frac{Z_0 - Z_g}{Z_0 + Z_g}\right)^2\right]}$$

Since the described apparatus and method of discontinuity measurement is substantially independent of the rise time of the step function signal, a step function signal of a longer rise time can be used in conjunction with a conventional real time oscilloscope. The resulting T.D.R. apparatus no longer utilizes the sampler 31 in FIG. 1 and the reflection coefficient, return loss, capacitance and inductance values may be determined from the preceding formulas with the elimination of the term $t_r/t_s$. The real time, $t_r$, in this case equals the sweep time, $t_s$, and the value therefore becomes 1.

What is claimed is:

1. A time domain reflectometer apparatus for measuring the reflection coefficient of at least one reactive discontinuity in a transmission line, the apparatus comprising:
   means for applying an incident step function signal to one end of the transmission line,
   means for integrating at least one signal reflected from the transmission line,
   means for displaying the incident step function signal and integrated signal so as to determine the reflection coefficient from the formula $$\Gamma = \frac{2\pi f \left(\frac{A_i}{A_s}\right)}{1 - \left[\frac{Z_0 - Z_g}{Z_0 + Z_g}\right]^2}$$

where:
$\Gamma$ is the reflection coefficient of the discontinuity,
$f$ is the frequency at which the reflection coefficient measurement is desired,
$A_s$ is the amplitude of the incident step function signal,
$A_i$ is the amplitude of the integrated signal,
$Z_o$ is the characteristic impedance of the transmission line,
$Z_g$ is the impedance of the incident step function signal source.

2. A time domain reflectometer apparatus for measuring the reflection coefficient of at least one reactive discontinuity in a transmission line, the apparatus comprising:
   means for applying incident step function signals to one end of the transmission line,
   means for sampling the incident step function signals and for sampling signals reflected from the transmission line,
   means for integrating the samples of the signals reflected,
   means for displaying the samples of the incident step function signal and for displaying the integration of the samples of the signals reflected from the reactive discontinuity in the transmission line so as to determine the reflection coefficient from the formula $$\Gamma = \frac{2\pi f \left(\frac{A_i}{A_s}\right)\left(\frac{t_r}{t_s}\right)}{1 - \left[\frac{Z_0 - Z_g}{Z_0 + Z_g}\right]^2}$$

where:
$\Gamma$ is the reflection coefficient of at least one discontinuity,
$f$ is the frequency at which the reflection coefficient measurement is desired,
$A_s$ is the amplitude of the incident step function signal,
$A_i$ is the amplitude of the integrated signal,
$Z_o$ is the characteristic impedance of the transmission line,
$Z_g$ is the impedance of the incident step function signal source,
$t_r$ is real time,
$t_s$ is horizontal sweep time.

3. A method of measuring the reflection coefficient of at least one reactive discontinuity in a transmission line, comprising the steps of:
   a. applying an incident step function signal to one end of the transmission line,
   b. integrating at least one signal reflected from the transmission line,
   c. displaying the incident step function signal and the integrated signal to determine the reflection coefficient from the formula $$\Gamma = \frac{2\pi f \left(\frac{A_i}{A_s}\right)}{1 - \left[\frac{Z_0 - Z_g}{Z_0 + Z_g}\right]^2}$$

where:
$\Gamma$ is the reflection coefficient of the reactive discontinuity,
$f$ is the frequency at which the reflection coefficient measurement is desired,
$A_s$ is the amplitude of the incident step function signal,
$A_i$ is the amplitude of the integrated signal,
$Z_o$ is the characteristic impedance of the transmission line,
$Z_g$ is the impedance of the incident step function signal source.

4. The method of measuring the reflection coefficient of at least one discontinuity in a transmission line, comprising the steps of:
   a. applying incident step function signals to one end of the transmission line,
   b. sampling the incident step function signals and signals reflected from the reactive discontinuity in the transmission line,
   c. integrating the samples of signals reflected from the transmission line,
   d. displaying the samples of the incident step function signals and the integrated samples of the signals reflected from the reactive discontinuity in the transmission line to determine the reflection coefficient from the formula $$\Gamma = \frac{2\pi f \left(\frac{A_i}{A_s}\right)\left(\frac{t_r}{t_s}\right)}{1 - \left[\frac{Z_0 - Z_g}{Z_0 + Z_g}\right]^2}$$

where:
$\Gamma$ is the reflection coefficient of the reactive discontinuity,
$f$ is the frequency at which the reflection coefficient measurement is desired,
$A_s$ is the amplitude of the incident step function signal,
$A_i$ is the amplitude of the integrated signal,
$Z_o$ is the characteristic impedance of the transmission line,
$Z_g$ is the impedance of the incident step function signal source,
$t_r$ is real time,
$t_s$ is horizontal sweep time.